US005956512A

United States Patent [19]
Simmons et al.

[11] Patent Number: 5,956,512
[45] Date of Patent: Sep. 21, 1999

[54] COMPUTER PROGRAM DEBUGGING IN THE PRESENCE OF COMPILER SYNTHESIZED VARIABLES

[75] Inventors: Steven M. Simmons, Dallas; Gary S. Brooks, Garland, both of Tex.

[73] Assignee: Hewlett-Packard Co., Palo Alto, Calif.

[21] Appl. No.: 08/536,196

[22] Filed: Sep. 29, 1995

Related U.S. Application Data

[63] Continuation of application No. 07/893,658, Jun. 5, 1992, abandoned.

[51] Int. Cl.$^6$ .................................................. G06F 9/45
[52] U.S. Cl. ........................... 395/705; 395/704; 395/707
[58] Field of Search ................................... 395/704, 705, 395/708, 709, 707

[56] References Cited

U.S. PATENT DOCUMENTS

| | | | |
|---|---|---|---|
| 4,667,290 | 5/1987 | Goss et al. | 364/306 |
| 4,953,084 | 8/1990 | Meloy et al. | 364/200 |

OTHER PUBLICATIONS

P.T. Zellweger, Xerox Corporation, Palo Alto Research Center, *Interactive Source–Level Debugging of Optimized Programs*, 1984.

P.T. Zellweger, "An Interactive High–Level Debugger for Control–Flow Optimized Programs (Summary)", Association for Computing Machinery, 1983, pp. 159–171.

B. Beander, Digital Equipment Corporation, "VAX Debug: An Interactive, Symbolic, Multilingual Debugger", Association for Computing Machinery, 1983, pp. 173–179.

D. Coutant, S. Meloy & M. Ruscetta, "DOC: A Practical Approach to Source–Level Debugging of Globally Optimized Code", Hewlett–Packard, Association for Computing Machinery, 1988, pp. 125–134.

J. Hennessy, Stanford University, "Symbolic Debugging of Optimized Code", *ACM Transactions on Programming Languages and Systems*, vol. 4, No. 3, Jul. 1982, pp. 323–344.

"Technical Correspondence—A Note on Hennessy's "Symbolic Debugging of Optimized Code"", *ACM Transactions on Programming Languages and Systems*, vol. 7, No. 1, Jan. 1985, pp. 176–181.

U. Hozle, C. Chambers & D. Ungar, "Debugging Optimized Code with Dynamic Deoptimization", Association for Computing Machinery, 1992, pp. 32–43.

W.H. Harrison, "Compiler Analysis of the Value Ranges for Variables", *IEEE Transactions on Software Engineering*, vol. SE–3, No. 3, May 1977, pp. 243–250.

A. V. Aho, R. Sethi & J. Ullman, *Compilers, Principles, Techniques & Tools*, Addison Wellsey, Copyright 1986, Reprinted 1987, pp. 643–648.

A. V. Aho, R. Sethi & J. Ullman, *Compilers, Principles, Techniques & Tools*, Addison Wellsey, Copyright 1986, Reprinted 1987, pp. 703–711.

*Optimizing compilers address debugging and user control constraints*, 8167 Computer Design 27 (1988) Jul., No. 13, Littleton, MA, USA, pp. 48–59.

Aho et al., "Compilers Principles, Techniques, and Tools," Addison–Wesley Publishing, Reading, MA, pp. 34, 280–282, 290–293, 298–299, 316, and 325, 1988.

*Primary Examiner*—Emanuel Todd Voeltz
*Assistant Examiner*—Peter J. Corcoran, III

[57] ABSTRACT

A debugger is used in an environment of optimized compiling to track both user-defined and synthesized variables so that the values of these variables at selected programmer counter addresses can be either determined or set. The tracking is primarily accomplished by the generation of various interrelated tables including a Type Scope Table, a Name Space Table, an Expression Table, a Location Range Tab and a Variable Table. These tables define the existence of variable at defined program counter ranges and provide the algebraic definitions for the synthesized variables. A programmer can efficiently debug a program produced with optimized compiling through the operations of determining variable values and setting variable values.

8 Claims, 9 Drawing Sheets

```
SOURCE CODE          PSEUDO NON-OPTIMIZED
                          MACHIE CODE

INTEGER *4 A(N)           MOV #1,I
                     L1:  MOV I,<TEMP>
DO I=1,N                  MUL #4,<TEMP>
                          ADD.ADDR A,<TEMP>
  A(I)=0                  MOV 0,@<TEMP>
ENDDO                     ADD #1,I
                          TEST I,N
                          BLE L1
```

FIG. 2

```
LOGICAL SOURCE CODE     PSEUDO OPTIMIZED CODE
?i = LOC(A)             { MOV.ADDR A,?i
?j = LOC (A)+4*(N-1)    ⎡ MOV N,?j
DO WHILE (?i .LEQ. ?j)  ⎢ SUB #1,?j
  @(?i) = 0             ⎢ MUL #4,?j
  ?i=?i+4               ⎣ ADD.ADDR A,?j
ENDDO              L1:    MOV 0,@?i
                          ADD #4,?i
                          TEST ?i,?j
                          BLE L1
```

FIG. 3

```
SOURCE CODE         LINEAR EQUATIONS
INTEGER*4 A(N),B(N)

DO I=1,N,1
  A(I)=0            ?i1 = LOC(A)+(I-1)/4
ENDDO

DO I=N,1,-1
  B(I) = 0          ?i2 = LOC(B)-4+4*N+(I-N)/4
ENDDO
```

FIG. 4

BEFORE DECYCLE

AFTER DECYCLE

| XSECT | BASE | STEP | SYMBOLIC ANNOTATION | REPLACED EXPRESSION |
|---|---|---|---|---|
| 1 | 1 | 5 | (I-1)/5 | I |
| 2 | 3 | 5 | (I-1)/5 | I+2 |
| 3 | loc(A) | 5*4 | (I-1)/5 | A(I) |

AFTER RECYCLE

SYNTHESIZED VARIABLE

?i1=loc(A)+4*5(I-1)/5
?i2=3+5*(I-1)/5

TYPE SCOPE TABLE (28) ENTRY

| FOO | FUNCTION WITH ARGS(A,N) RETURNS NOTHING | LEXICAL SCOPE GLOBAL | POINTER TO VARIABLE TABLE ENTRY |
|---|---|---|---|
| 60 | 62 | 64 | 66 |

VARIABLE TABLE (42) ENTRY

| CLASS: EXTERNAL DEFINITION | OFFSET:0 | USER DEFINED | ASSORTED FLAGS | POINTER TO TYPE SCOPE ENTRY |
|---|---|---|---|---|
| 70 | 72 | 74 | 76 | 78 |

*FIG. 10*

TYPE SCOPE TABLE (28) ENTRY

| N | INTEGER*4 | LEXICAL SCOPE SUBROUTINE FOO | POINTER TO VARIABLE TABLE ENTRY |
|---|---|---|---|
| 60 | 62 | 64 | 66 |

VARIABLE TABLE (42) ENTRY

| CLASS: ARGUMENT POINTER | OFFSET:0 | USER DEFINED | ASSORTED FLAGS | POINTER TO TYPE SCOPE ENTRY | POINTER TO LOCATION RANGE ENTRY |
|---|---|---|---|---|---|
| 70 | 72 | 74 | 76 | 78 | 82 |

LOCATION RANGE TABLE (43)

| HOME OFFSET | 4 | START 80 | END 196 | POINTER TO VARIABLE TABLE ENTRY |
|---|---|---|---|---|
| 94 | 96 | 98 | 100 | 102 |

| EPHEMERAL REGISTER | ε0 | START 84 | END 90 | POINTER TO VARIABLE TABLE ENTRY |
|---|---|---|---|---|
| 94 | 96 | 98 | 100 | 102 |

VARIABLE TABLE (42) ENTRY

| CLASS: AUTOMATIC | OFFSET:0 | SYNTHESIZED | ASSORTED FLAGS | POINTER TO EXPRESSION TABLE ENTRY | POINTER TO LOCATION RANGE ENTRY |
|---|---|---|---|---|---|
| 70 | 72 | 74 | 76 | 80 | 82 |

EXPRESSION TABLE (29) ENTRY

| ?i4 | LOOP INDUCTION VARIABLE | USE ?i2 | EXPRESSION ?i4=?i2+2 | POINTER TO VARIABLE TABLE ENTRY |
|---|---|---|---|---|
| 84 | 86 | 88 | 90 | 92 |

LOCATION RANGE TABLE (43) ENTRIES

| HOME OFFSET | 0 | START 142 | END 194 | POINTER TO VARIABLE TABLE ENTRY |
|---|---|---|---|---|
| 94 | 96 | 98 | 100 | 102 |

| EPHEMERAL REGISTER | s3 | START 142 | END 152 | POINTER TO VARIABLE TABLE ENTRY |
|---|---|---|---|---|
| 94 | 96 | 98 | 100 | 102 |

COMPUTER PROGRAM DEBUGGING IN THE PRESENCE OF COMPILER SYNTHESIZED VARIABLES

This is a continuation of application Ser. No. 07/893,658, filed on Jun. 5, 1992, now abandoned.

FIELD OF THE INVENTION

The present invention pertains in general to compiler technology and in particular to the debugging of computer programs which have been compiled with the use of optimization.

BACKGROUND OF THE INVENTION

The use of compiler optimizations makes possible much faster execution of an executable file, but optimized code is much more difficult to debug as a result of the movement, reordering, substitution and other operations performed upon the code as a result of the optimization procedures. In particular, it is difficult to determine the present value of a user-defined variable when that variable has been replaced with a compiler synthesized variable.

In previous debuggers, a user's program variable was recorded by the compiler to be in a specific location. The debugger accesses that one specific location in memory to evaluate the variable. With sophisticated optimizations, a variable is defined to be in zero or more locations over a range of addresses.

In such preexisting debugger programs, each user variable is mapped directly to a section of memory in the program's dataspace. That is, each variable has a definite location in either the user's static section of memory or locally in the current call frame. However, as optimizing compilers have become more sophisticated, many uses of variables are replaced with more efficient uses of different variables. If the debugger program were to read the value of a variable at the allocated address for that user-defined variable, it would be erroneous. Therefore, there exists a need for an explicit method that relates compiler synthesized variables to user-defined variables.

SUMMARY OF THE INVENTION

A selected embodiment of the present invention is a method for establishing definitions for synthesized variables in source code and object code compiled therefrom. The method includes a step of processing the source code to determine the presence of variables therein. A type scope table is generated which includes an entry for each of the variables in the source code. Each entry includes an identification of a variable, the lexical scope for the variable and type of the variable. The source code is processed to produce compiler nodes and synthesized variables. An expression is generated to define each of the synthesized variables. Each of the synthesized variables is annotated with the respective expression that relates it to other synthesized variables or user defined variables. Object code is then generated as machine language instructions as a function of the compiler nodes and the synthesized variables. An Expression Table is generated which includes an entry for each of the variables and includes in each Expression Table entry a variable identification and the corresponding one of the expressions. A Location Range Table is generated which includes an entry for each of the variables used in the program and includes in each location range entry a variable identification, a location for the variable in the entry and a range of machine instructions which utilize the variable. Last, a Variable Table is generated which includes an entry for each of the variables and includes in each entry therein a class identification, a notation of being either a user or synthesized variable and a link to one of the entries in the Type Scope Table. As a result, the tables define each of the variables for a given one or range of the object code machine instructions.

A further aspect of the present invention is an improved debugger program for use with object code which has been compiled by the use of optimization from the original source code. The optimization generates synthesized variables which are developed from identifiers that include both user-defined variables and the synthesized variables. The improvement to the debugger comprises a Type Scope Table having a plurality of entries, each entry including at least an identification for one of the identifiers and a lexical scope within which the identifier in the entry is located. A Variable Table is provided which has a plurality of entries, each entry including at least a storage class description, an initial offset for the variable in the entry and a pointer from this entry to a corresponding entry in the Type Scope Table. An Expression Table is provided which has a plurality of entries and each entry includes at least an identification for a synthesized variable, an expression for the variable in the entry, and a pointer to a corresponding entry in the Type Scope Table. Last, a Location Range Table is provided which has a plurality of entries and each entry includes at least a basic location argument for a given variable, a program counter range over which the given variable is alive and a pointer to a corresponding entry in the Variable Table.

In further aspects of the present invention, there are provided in conjunction with the tables noted above, a method for determining the value for a variable at a given program counter and a method for writing a value into a variable when the program is at a selected program counter.

BRIEF DESCRIPTION OF THE DRAWINGS

For a more complete understanding of the present invention and the advantages thereof, reference is now made to the following description taken in conjunction with the accompanying drawings in which:

FIG. 2 is a table illustrating source code and non-optimized machine code to illustrate the need for optimization, FIG. 3 is a listing of logical source code and corresponding pseudo-optimized code illustrating the optimization of code and demonstrating the advantages thereof, FIG. 4 is a listing of source code and related linear equations for defining expressions for each synthesized variable, FIGS. 10, 11 and 12 are illustrations of certain tables in FIG. 9 with specific examples for each field.

DETAILED DESCRIPTION OF THE INVENTION

Figure 1:
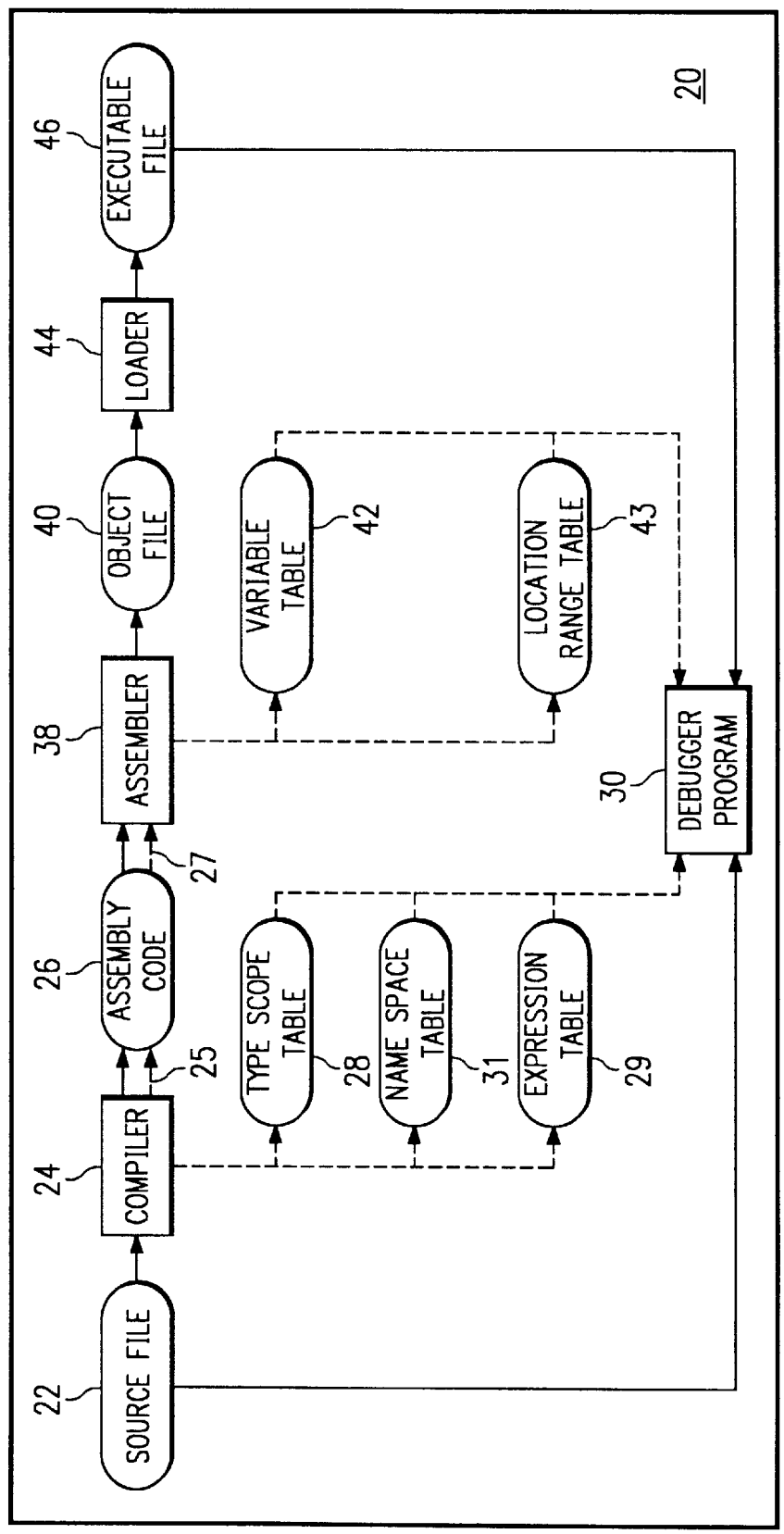
FIG. 1 is a block diagram illustrating the general environment for compiling and assembling source code into object code and further includes aspects which represent the present invention and its relationship to the general environment.

The overall flow of information and relationships of various programs used in compiling-debugging code is illustrated in a flow diagram 20 shown in FIG. 1. Briefly, the solid arrows represent the conventional flow of information in a traditional compiler-debugger environment. The dashed arrows represent the information and data flow added to the conventional process in accordance with the present invention.

A source file 22 is produced by a programmer in any one of many available languages such as "C", FORTRAN or others. The source file 22 is provided to a compiler 24 which produces assembly code 26. In one aspect of the present invention, the compiler 24 further produces a Type Scope Table 28, an Expression Table 29, and a Name Space Table 31, each of which is further defined below. For each source file, such as 22, there is provided a separate Type Scope Table 28, Expression Table 29, and Name Space Table 31. The Tables 28, 29 and 31 are provided to a debugger program 30. The source file 22 is likewise provided to the debugger program 30.

The assembly code 26 is provided to an assembler 38 which in turn produces an object file 40. The assembler 38 produces a Variable Table 42 and a Location Range Table 43, each of which is further defined below.

A loader 44 receives one or more of the object files 40 and links them together to produce an executable file 46 which is also provided to the debugger program 30. The debugger program 30 receives the source file 22 and the executable file 46 as well as the Type Scope Table 28, Expression Table 29, and Name Space Table 31, and further receives the Variable Table 42 and Location Range Table 43. The present invention provides a mechanism and process for tracking both user-defined and synthesized variables through the compilation and assembly process so that upon execution of a program, the existence and value of any variable can be determined.

The process of compiler optimization utilizes many subtle techniques to improve performance. One technique is to replace the use of certain user-defined variables with variables that are more easily accessible. These newly created variables are referred to as "compiler synthesized variables". The present invention is preferably used in conjunction with a compiler which performs optimization to enhance the operating speed of the resulting executable program. Such compiler optimization is described in, for example, Alfred Aho, et al, "Compilers: Principles, Techniques, and Tools", Addison Wesley Publishing Company, copyright 1986.

By replacing a user-defined variable with a compiler synthesized variable, the execution time of machine code can be substantially reduced. Referring to FIG. 2, there is shown a listing of source code together with corresponding non-optimized machine code. The source code listing includes a loop indicated by the DO function. The *4 in the source code becomes #4 in the machine language. Likewise, the numeral 1 becomes the #1 in the machine code. The illustrated source code would be more efficient if the array calculation in the middle of the loop were replaced with a variable that is a pointer into the array. For the machine code, it is assumed that each identifier is an address, <temp> is a general purpose register, and @ implies one level of indirection. FIG. 2 therefore illustrates compiled code which does not run efficiently because it has not been optimized.

Referring to FIG. 3, there is illustrated a listing of logical source code and corresponding optimized machine code. In the optimized machine code, two new variables are synthesized. Synthesized variables are created during the compiling process. The first variable (?i) is a pointer into the array of A. The second variable (?j) is the test for the top of a loop relative to A. For this example, it is assumed that the hook variables (those starting with the symbol ?) in the machine code are similar to <temp> used in the non-optimized code in FIG. 2 and the @ sign implies indirection.

Further referring now to FIG. 3, note that the optimized code has three fewer instructions (4 versus 7) in the main loop as compared to the main loop of the non-optimized code shown in FIG. 2. The instructions produced by the optimization are also faster to execute because they are "add" rather than "multiply". The benefit of this optimization is that the code in the loop usually executes more often than the code preceding the loop.

During debugging, a user typically wishes to determine the current value of "I" for each iteration of the loop or the top test of "N". If the user were to reference the actual allocated memory locations for either "I" or "N", an incorrect value would be read because these locations in memory have become stale. In the optimized case, the variables are not further referenced, the compiler can detect this and choose not to further update the variable. Therefore, symbolic information must be produced that maps the user variables "I" and "N" to the realized variables of "?i" and "?j", respectively. That is, the following two expressions (equations) represent a consistent linear relationship among the values shown in FIG. 3:

$$I=((?i-LOC(A))/4)+1$$
$$N=((?j-LOC(A))/4)+1$$

When the debugger user requests the value of "I", the debugger program must interrogate the currently executing program for the value of "?i" and calculate the value of "I". Since either "I" or "N" may also be used in other portions of the code, a set of address ranges for the machine code must be produced for the program counter to show where this relationship holds true. These variables may not be replaced by optimization in other portions of the code, and in these portions they can be accessed directly. Therefore, the debugger must also interrogate the application process (executing program) to determine the current program counter (PC) value. The PC is needed to determine the range in which the variable is located.

The complexity of this task lies in both recording the information during compilation and evaluating it while debugging. Whenever a new synthesized variable is introduced, an algebraic expression (see above) must be determined and propagated to the debugger. During debugging, this equation must be solved along with any other expressions that use this variable.

With the present invention, the value for a variable is not always found in memory, but instead is derived from a set of expressions and a combination of the values of other variables and other values in global memory or registers or on the stack.

The process of compiler optimization for "C" code is described in "CONVEX C Optimization Guide", 2nd Edition, Convex Press, Richardson, Tex., April, 1991. Compiler optimization of FORTRAN code is described in "CONVEX FORTRAN Optimization Guide", 3rd Edition, Convex Press, Richardson, Tex., November, 1991.

In accordance with the present invention, there are produced five separate tables by the compiler operation, which was briefly described in reference to FIG. 1. These tables are as follows:

(1) Type Scope Table
(2) Name Space Table
(3) Variable Table
(4) Expression Table
(5) Location Range Table

Type Scope Table

This table tracks the names, scoping and type information about all user-defined identifiers within the program. An important subset of program identifiers are variables. These are user-defined variables that may change values during the lifetime of the program.

Name Space Table

The Name Space Table is an index of all globally (externally) visible identifiers in the Type Scope Table. These identifiers exist throughout the life of a program. This table is generated in conjunction with the Type Scope Table. Each entry in the Name Space Table points to a lexical scope entry in the Type Scope Table. This is a commonly used table in the field of compiler debugger technology.

Variable Table

This table tracks attributes about every variable in the program (both user-defined and synthesized). It points directly to a respective entry in the Type Scope Table and defines its storage class. The storage class explains whether the variable is allocated on a call stack, static data segments or even within the code segments. If the variable is synthesized, there is provided a pointer to the Expression Table.

Expression Table

This table tracks the expressions (algebraic equations) for all synthesized variables. Therefore, if a synthesized variable (for example, "?i") is created, a corresponding expression is also created describing how this variable is related to the user-defined variables. This table also records the reason for the synthesization of the variable and provides an identifier for this variable.

Location Range Table

The purpose of this table is to explicitly define the location of each variable over a range of program counter addresses for the machine instructions. That is, a variable may be located in a stack location in memory over one range of program counters but the same variable may be located in a register over another range of program counter values.

The Expression Table and Location Range Table are tightly integrated with each other. That is, an expression for a variable is only alive when all of its components are alive. This is illustrated by the code listing in FIG. 4 which shows a sample listing of source code together with corresponding expressions (linear equations).

When a user is debugging a program, as represented by the source code shown in FIG. 4, he may wish to determine the value of I. To do this, it must be determined which expression is active. Note in FIG. 4 that two expressions have been produced for synthesized variables. These are for the variables ?i1 and ?i2. The Location Range Table tracks that the "?i1" variable is active only over the PC addresses where the code for the first loop variable is generated and that "?i2" is active only over the addresses (program counter) where the code for the second loop is generated. For example, the Location Range Table may show that the synthesized variable "?i1" is alive between the PC boundaries of 84 to 90 and "?i2" is alive between the boundaries of 120 to 134.

Each of the five tables noted above must be generated in the compiler operation. It is important to note that the compiler proceeds through several different phases. The process of generating the tables is simplified with the appropriate phases. A preferred compiler for use with the present invention is the FORTRAN or "C" compiler produced by Convex Computer Corporation, Richardson, Tex.

"Compiler node" is a term used in the following description. This term represents a computation or control flow which exists within a program. Compiler nodes include entry nodes and computation nodes as shown in FIG. 6.

Figure 6:
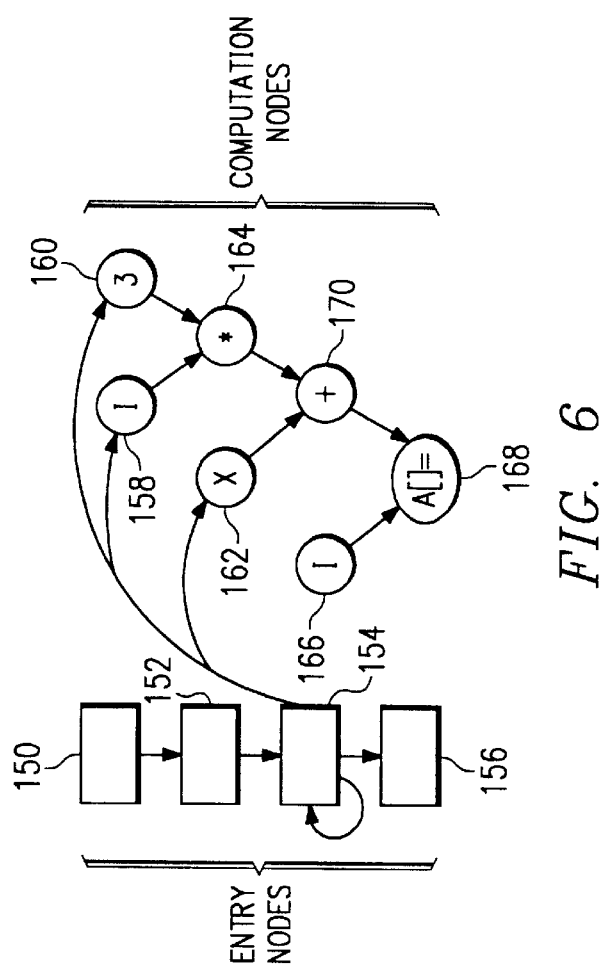
FIG. 6 is a schematic illustration of entry and compiler nodes for an expression for use in compiling.

Referring to FIG. 6, the compilation process begins by defining compiler nodes for the source code. There are two types of compiler nodes. These are (1) entry nodes and (2) computation nodes. Entry nodes are used to model basic blocks, which are commonly used and well known in the field of compiler technology. The entry nodes form a graph which represent the control flow in the program. An entry node is associated with a directed acyclic group of computation nodes. Computation nodes are used to represent computations embodied within a program. Referring further to FIG. 6, there are illustrated entry nodes 150, 152, 154 and 156 and computation nodes 158, 160, 162, 164, 166, 168 and 170.

The significant phases provided by the Convex Computer Corporation compilers, noted above, are as follows:

Front-End

For each language, there is a unique front-end. The front-end has the responsibility of handling both the language syntax and semantics during this phase. The resulting output is an intermediate language. This intermediate language of compiler nodes specifies both the expressions and the control flow within the current program using a language neutral representation.

Build Directed Graph

Immediately upon entry into the back end, a directed graph of basic blocks is built defining the control flow relationships among all of the different expressions in the program. All code that must of necessity execute together are grouped in basic blocks. That is, the execution of the first expression in the basic block implies the execution of all subsequent expressions. After building this graph, several passes over it are made to perform the traditional optimizations such as redundant assignment elimination, dead code elimination, constant folding, etc.

Decycle Loop

In order to perform loop optimizations, all cycles in the loop are broken and the body of the loop is treated as a basic block. Any expression that is loop variant is hoisted to the preheader of the loop and treated as a linear series.

Cycle Loop

After decycle loop and other optimizations have taken place, all cycles are placed back into the loop. Many synthesized variables are introduced at this point. These synthesized variables are used as the new loop control variables since most loops no longer bear any resemblance to the original form. The decycle loop and cycle loop phases can be repeated.

Code Generation

Code generation is next performed. In this phase, the machine instructions to be executed are defined and variables are allocated to registers. Also, global register allocation is performed. This produces a register map. The register map specifies which variables are in which registers on entry to a basic block. Global register allocation implies selecting the appropriate register so values of variables may be passed between basic blocks without the need for storage and retrieval from memory.

Assembly

In this phase, the generated code is turned into machine instructions and stored into either an assembler source program or an object file.

The Type Scope Table is generated by the respective front-end of each compiler. Within the front-end, a symbol table contains all of the necessary scoping, identifier, and type information. Most of this information is emitted by walking the symbol table during the front-end phase. The Name Space Table is likewise generated during this phase.

The Variable Table is also derived from the symbol table; however, this information is extracted after code generation has occurred. This is necessary because the code generator determines where each variable is located in memory.

The Location Range Table is built after code generation. It must walk a directed graph of the computation or basic block or entry nodes for processing the nodes within each basic block. The register map is produced by the global register allocator. This map defines what variables are located in each register upon entry into the basic block. The location range is started for each variable in the register map. Then, they (location ranges) are processed through each instruction or node in the basic block, walking through each instruction in the basic block, looking at the effects of each instruction and determining whether the instruction can start a new range (for example, loading I into a register), or, an effect can be to end a range.

If an unrelated quantity is placed in a register for which a range already exists, for example, I is placed in register 1 (R1) starting at some program counter, for example, X, then the range will be terminated.

An example of range determination is as follows:

```
I = (I+I)*4
Load I → R1            Start range for I in R1
Move R1 → R2           Start range for I in R2
R2 = I+I R1 R2         End range for I in R2
Move #4 → R1           End range for I in R1
R1 = (I+I)*4 R2 R1
```

Once every instruction in the basic block is processed, the logical control flow within the block is assumed complete. If there are any ranges that are still open at that point, those ranges are closed out at the end of the basic block.

Figure 5:
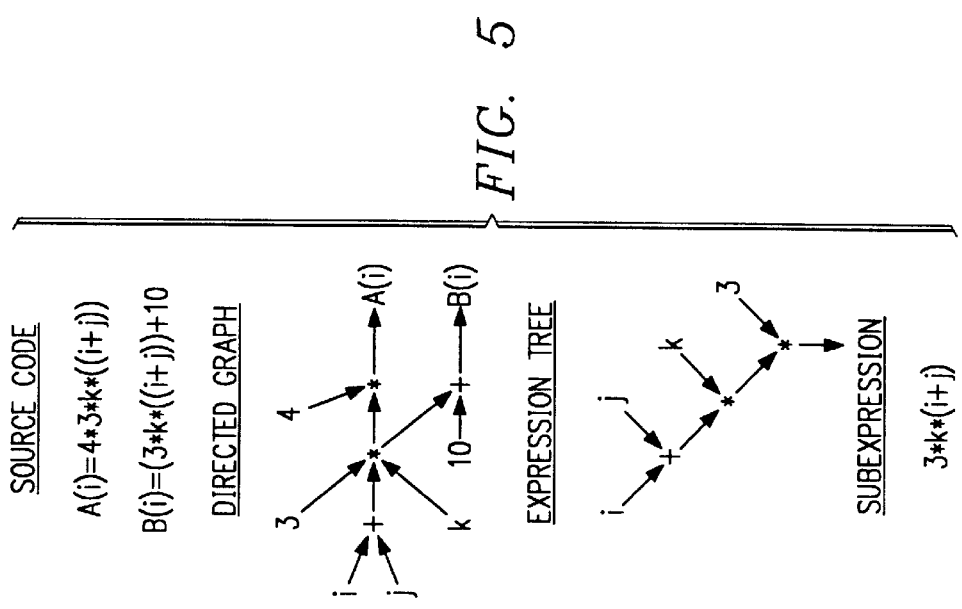
FIG. 5 is an illustration of a sample of source code with a corresponding directed graph, expression tree and subexpression.

The Expression Table is further defined in reference to FIG. 5. In this figure there is shown a sample of source code, a directed graph, an expression tree and a subexpression. Whenever a variable is synthesized, an expression is produced. However, synthesized variables are introduced sporadically throughout all of the phases of the compiler. Determining the expression for the synthesized variable is done by walking the directed graph backwards and creating an expression tree, as shown. The graphs shown in FIG. 5 represent the case for a redundant expression. The directed graph represent the logical structure of the two lines of source code. When the compiler finds the subexpression "3*k*(i+j)" in the directed graph, it creates a synthesized variable. The synthesized variable represents the subexpression. The expression tree is then built from the directed graph. The expression tree can be stored into a data file.

FIG. 6 shows some of the entry nodes for a sample FORTRAN routine line of code illustrated below. Entry nodes are identified by the reference numerals 150, 152, 154 and 156. At entry node 154, the computation nodes 158, 160, 162, 164, 166, 168 and 170 represent the calculation of:

$$a(i) = i * 3 + x$$

The computation nodes are used at the code generation phase to produce the machine language instructions.

A further significant case in synthesized variables is that of loop induction variables. For example, two synthesized loop induction variables are created from the following code:

```
INTEGER*4 A(N)
DO I = 1, N, 5
  A(I) = I+2
ENDDO
```

One synthesized variable is required to function as a pointer into the array of A. The other is for the expression I+2. These synthesized variables are introduced logically at the time of the Decycle phase as a node to be referred to as an XSECT node (described below). However, the synthesized variables are not realized until the Cycle phase.

A significant aspect of the present invention is that of an XSECT node. See FIGS. 7a, 7b and 7c. Such a node has two inputs, one is a base and the other is a step. The base is the initial value for the node and the step is the increment. The logical output is a linear series of values. For example, an XSECT with a base of 3 and a step of 5 has a logical output that is the sequential series of 3, 8, 13, 18, 23, etc. Each value in the series is used during one iteration of the loop. XSECT is essentially a triplet as described in Aho et al. above at pages 643–648.

The XSECT node is transformed into a synthesized variable during the Cycle phase. At that time, using the base and step of the XSECT node yields the following equation:

$$\text{FINAL BASE} + \text{STEP} * (\text{CURRENT LOOP ITERATION})$$

Therefore, in accordance with the present invention, at the time of the XSECT node creation, the node is annotated with the expression that symbolizes each loop iteration. For the above example this is (I-1)/5. When both the XSECT nodes have been realized into synthesized variables, this quantity will be substituted for the current loop iteration. The synthesized variables for the XSECT nodes are defined by the expressions:

$$?i1=loc(A)+4*5*((I-1)/5)$$
$$?i2=3+5*(I-1)/5$$

These are the expressions that are emitted into the Expression Table by the compiler. Note the "4" in the first expression is the size of each element in the array A. Also, many of these values are folded together such as 4*5 is reduced to 20.

Figure 7A:
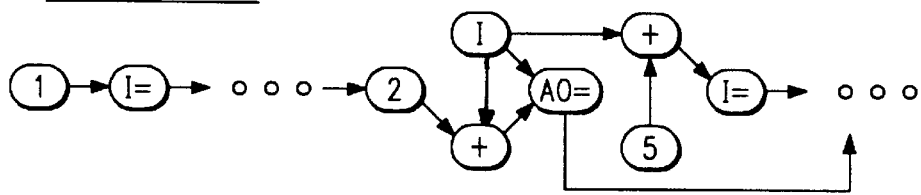
FIGS. 7a, 7b and 7c illustrate the identification, annotation and transformation of XSECT compiler nodes.
Figure 7B:
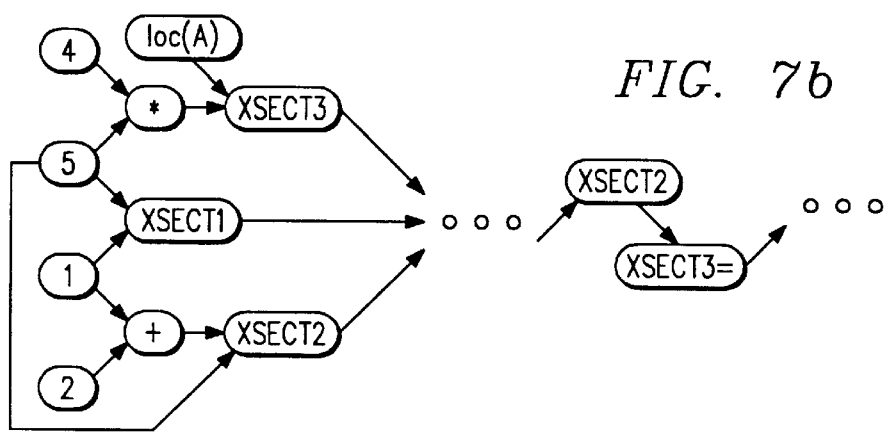
Figure 7C:
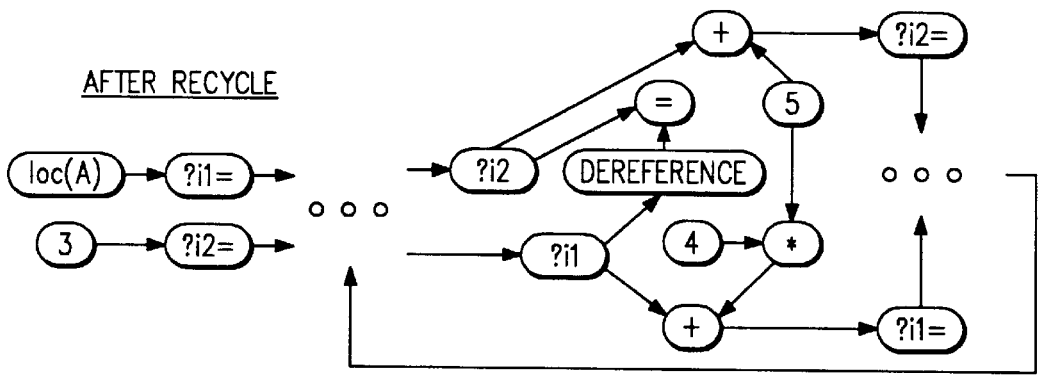

Referring now to FIGS. 7a, 7b and 7c, there are provided a series of diagrams illustrating the implementation of an XSECT node, the annotations of such nodes and the transformations of these nodes into synthesized variables.

Referring to FIG. 7a, there is shown the graph of the code (shown immediately above) before the Decycle process is performed. The quantities within the ovals are computation nodes.

FIG. 7b is an illustration of the graph structure of FIG. 7a which has been produced after the Decycle phase. Computation nodes have been created which are identified as XSECT 1, XSECT 2 and XSECT 3. Each of these XSECT nodes is defined in FIG. 7b to have a base, a step and a symbolic annotation. One major aspect of the present invention is the annotation of the XSECT nodes as shown in FIG. 7b. The principal occurrence illustrated in FIG. 7b is that the XSECT nodes have been created from the body of the loop to perform further optimizations. Note that a loop no longer exists in FIG. 7b because the code has been decycled (all cycles removed).

Referring now to FIG. 7c, there is shown the next step in the processing which is entitled "After Recycle". Many optimizations occur after decycling and before recycling. In this step, the XSECT nodes have been replaced with synthesized variables which define the XSECT nodes. The synthesized variable is initialized with the final base and incremented with the final step of XSECT. The equations are then generated using these values. XSECT 1 was removed from the graph since it does not feed anything else. The XSECT 2 and 3 compiler nodes have been transformed into synthesized variables wherein XSECT 3 has been transformed into ?i1 and XSECT 2 has been transformed into ?i2. ?i1 is a pointer to the current element in the array and must be dereferenced for a value to be stored there. (indicated by the dereference node)

A further concept that is used in conjunction with the present invention is that of "expression trees". The following description represents a process for generating an expression for a synthesized variable. Each expression tree is composed of one or more expression nodes. There are many types of expression nodes and these can be grouped into five kinds.

Each expression node has the following two fields.

type:
 An enumeration of ADD, USE, SUBTRACT, MULTIPLY, CONSTANT, etc.

kind:
 There are five kinds of expression nodes (SYMBOL, CONSTANT, OPERATOR, CONVERT, INTRINSIC).

Symbol Node:
 This is used for a variable within the expression. It contains these fields:
  Pointer to Variable Table Entry
  Data Type Intrinsic:
 This is used when there is a runtime library call such as to (SINE OR SQUARE ROOT) The fields are:
  Enumeration of the intrinsic (SINE, COSINE, SQUARE ROOT)
  Parameter list to pass. This is a list of expressions.
  Data Type of Returned Value Constant value:
 This is used when there are values in the equations. The fields are:
  Binary value of the constant
  Data type of constant Operator node:
 Used when this is an explicit operator like ADD, SUBTRACT, NEGATE. Handles only unary and binary operators. The fields are:
  Operand 1 points to another expression.
  Operand 2 points to another expression (not necessary for a unary operation).
  Resulting data type.

Convert node:
 Needed when converting between two data types. For example, it converts a floating expression to an integer expression. The fields are:
  The data type to convert to
  The data type from which you are converting
  The expression that is being converted For example: N+2 appears as the following:

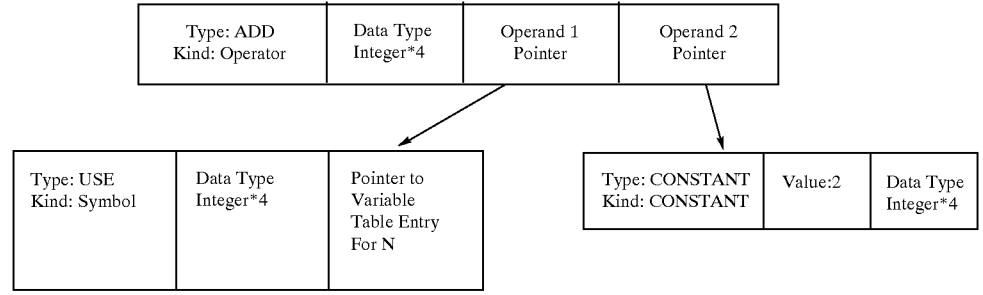

Each expression tree represents an expression which is stored in the Expression Table 29.

An example is now presented for the process of a user operating the debugger program of the present invention. This is described in reference to the following subroutine which is identified as "FOO".

1. SUBROUTINE FOO(A, N)
2. INTEGER*4 A(N)
3.
4. DO I=1, N, 5
5. A(I)=I+2
6. ENDDO
7.
8. END

The Type Scope Table includes definitions for all identifiers and their respective classes and scopes. The identifiers for the FOO routine are "FOO" which is the subroutine, "A" which is the array of integers, "I" which is the loop control integer, and "N" which is the upper bound of the array integer. All of the identifiers have the same scope of being within subroutine FOO.

The Variable Table for this subroutine contains all of the variables. That is, it contains entries for "FOO", "A", "I", and "N"; however, it also contains entries for synthesized variables "?i1", "?i2", and "?i3" which were produced in the compilation process.

The Expression Table for the routine FOO defines "?i1" as a pointer to the current entry into A. Applying induction variable elimination only, it has the expression:

$$?i1 = loc(A) + 4*5*((I-1)/5)$$

The synthesized variable "?i2" is defined as the expression of I+2. It has the expression:

$$?i2 = 3 + 5*(I-1)/5$$

The loop is restructured so that there is no longer a test of I<N but a test of (I+2)<(N+2). Thus, "?i3" is a synthesized variable with the following expression:

$$?i3 = N+2$$

The Location Range Table defines the location of "FOO" to be at a constant address in the code throughout the entire program. The addresses of "A" and "N" are defined to be relative to an argument pointer on the stack over the address range that is the body of the routine "FOO". "I" does not have a location since all uses to it have been optimized away. Lastly, "?i1", "?i2", and "?i3" are allocated to respective registers within the body of the loop.

Therefore, if the user were at a breakpoint at line 5 and requested the value of "I", the debugger would do a look up for the identifier in the Type Scope Table to see if the identifier existed. Next, it would do a look up to the Variable Table to see how the variable is realized in the machine code. The Variable Table then points directly to the Expression Table since "I" is used in several equations.

After determining that there are two equations that use "I", the program proceeds to calculate the value. First, it attempts to retrieve a value for "?i1". If it did have a value, the program then algebraically solves the expression for "I". Next, a similar operation is performed on "?i2". Since there are more equations than unknowns, the value for "I" may be inconsistent between equations. For example, this case may arise when the program is at a point between locations where both synthesized loop induction variables are incremented. If so, the user is informed about the inconsistency.

If the user places a breakpoint on line 2 [INTEGER*4 A(N)] neither "?i1" or "?i2" is active and so an informational message is generated to inform the user that the value for "I" is not available.

If the user wants to assign a new value to "I" during the debugging session, "I" is checked to be consistent among all of its equations. If it is consistent, the values for "?i1" and "?i2" are calculated from the respective equations by substituting the logical new value of "I". Then, the new calculated values are assigned to those two synthesized variables. If the value is inconsistent, the user is given an error message prohibiting assignment to "I".

DETAILED DESCRIPTION OF PROCESS FLOW

Figure 8:
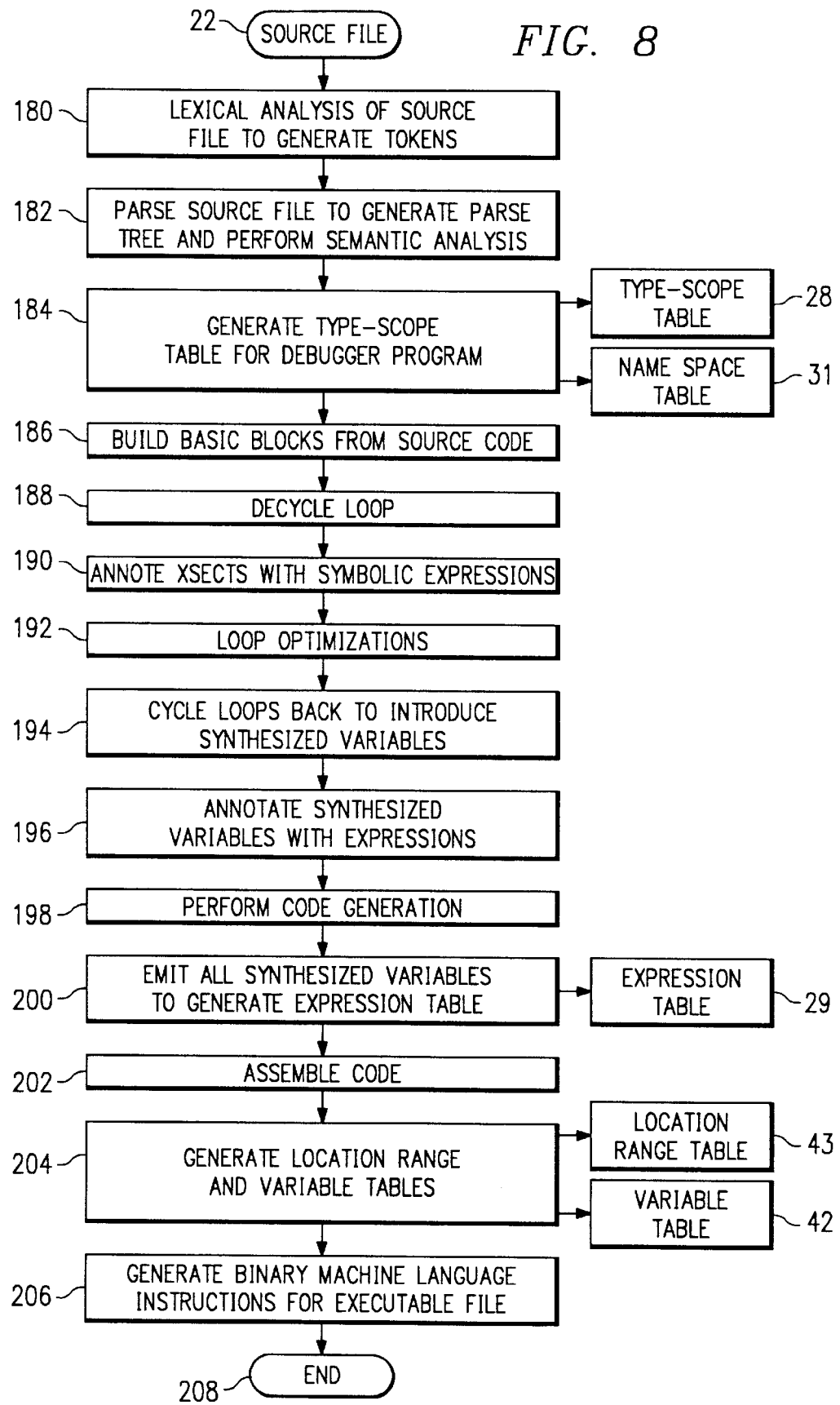
FIG. 8 is a flow diagram illustrating the generation of the tables noted in FIG. 8 within the compilation process.

In view of the above description of tables and operations, reference is now made to FIG. 8 for a description, in flow diagram form, for the generation of the Type Scope Table 28, Expression Table 29, Variable Table 42 and Location Range Table 43. The source file 22 is first subjected to operations in a block 180 to perform lexical analysis of the source file and thereby generate tokens. These tokens are used in operational block 182 for parsing the source file to generate a parse tree and to perform semantic analysis. The operations performed in blocks 180 and 182 are widely used and well known in the field of compiler technology.

In block 184, the Type Scope Table 28 is generated from the material produced by processing of the source code in operational blocks 180 and 182. The content of the Type Scope Table 28 is described in reference to FIG. 9 and Table 1 (below). The generated Type Scope Table 28 is provided to the debugger program 30. The Name Space Table 31 is further produced in the operations in block 184 and it is also provided to the debugger program 30.

Upon completion of generation of the Type Scope Table 28 and Name Space Table 31, control is transferred to an operational block 186 to build basic blocks from the source code. The building of such basic blocks, noted above, is conventional in compiler technology. Next, in block 188, there is performed the optimization procedure, described above, for decycle loop. Next, in block 190, the XSECTS nodes are annotated with the symbolic expressions produced in conjunction with creating these nodes. Following block 190, further loop optimizations are performed in operational block 192. In operational block 194, an operation is performed to cycle the loops back to introduce the synthesized variables. In block 196, the XSECT nodes are transformed to synthesized variables and these synthesized variables are annotated with the expressions which define the corresponding synthesized variables, as described above.

Upon completion of the operations in block 196, code generation is performed in operational block 198 upon the compiler nodes previously produced. This is conventional compiler technology.

In operational block 200, the Expression Table 29 is generated and it includes all of the synthesized variables and the corresponding expressions. Table 29 is provided to the debugger program 30.

In operational block 202, there is performed the operation necessary to assemble the code. This is conventional compiler technology.

Following block 202, there is performed in block 204 the operations required to generate the Location Range Table 43 and the Variable Table 42. These tables are produced by utilizing the machine instructions which have been produced in the assembly operation performed in block 202. The contents of each of these tables has been described above. A representative machine code listing for the routine FOO is shown below.

After generation of the Location Range Table 43 and Variable Table 42, operation is transferred to a block 206 to generate the binary machine language instructions for the executable file 46. The operation is completed at an END step 208.

Figure 9:
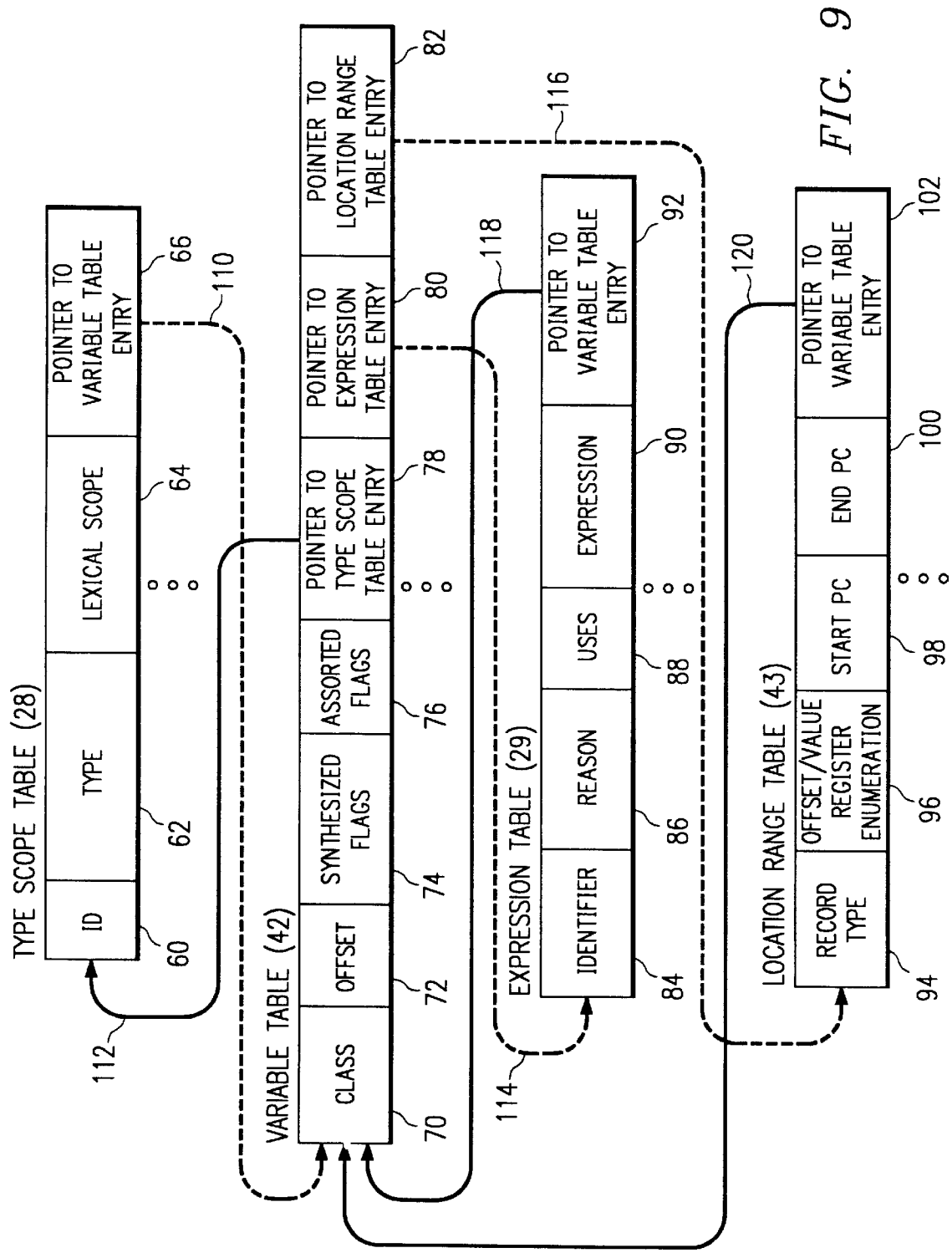
FIG. 9 is an overall illustration of the interrelationships of the Type Scope Table, Variable Table, Expression Table and Location Range Table for defining identifiers (variables) and their locations in the corresponding source and object codes.

Referring now to FIG. 9 there are illustrated fields and relationships for each of the Tables 28, 29, 42 and 43. One of a plurality of entries is shown for each table. There is shown in FIG. 9 an entry for each of the Tables 28, 42, 29 and 43. The Type Scope Table 28 entry includes fields 60 for ID of an identifier, 62 for data type, 64 for lexical scope and 66 for pointer to a Variable Table entry.

The Variable Table 42 includes fields 70 for class, 72 for offset, 74 for synthesized flag, 76 for assorted flags, 78 for pointer to Type Scope Table entry, 80 for pointer to Expression Table entry and 82 for pointer to Location Range Table entry. The Expression Table 29 includes fields 84 for identifier, 86 for reason, 88 for uses (list of variables used in the expression), 90 is the expression and 92 is a pointer to Variable Table entry.

The Location Range Table 43 includes fields 94 for the record type, field 96 for the variable offset value (home offset) or register enumeration (ephemeral), field 98 for start PC, field 100 for end PC and field 102 for a pointer to a Variable Table entry.

Linkages (pointers) between the various tables are indicated by lines. The solid lines represent an explicit pointer and the dashed lines represent an implicit pointer. A line 110 relates the Type Scope Table 28 entry to the Variable Table 42 entry. Line 112 relates the Variable Table 42 entry to the Type Scope Table 28 entry. Line 114 relates the Variable Table 42 entry to the Expression Table 29 entry. Line 116 relates the Variable Table 42 entry to the entry in the Location Range Table 43. Line 118 relates the entry in the Expression Table 29 to the Variable Table 42 entry. Line 120 relates the entry in the Location Range Table to the entry in the Variable Table 42.

FIG. 9 is an illustration that defines the various fields within each of the Tables 28, 42, 29 and 43. Examples of the implementations of these tables for the routine FOO, described above, are presented in FIGS. 10, 11 and 12.

FIG. 10 is an illustration of the use of these tables for the identifier FOO. Since FOO is itself a routine, only two of the tables are required. These are the Type Scope Table 28 entry and the Variable Table 42 entry. Entries are not required for the Expression Table 29 and Location Range Table 43. Namely, there is no expression for the routine FOO, and it is alive over the entire range of the machine instructions.

Referring to FIG. 10, the field 60 includes the name FOO, field 62 for type indicates a function with arguments A, N and the routine returns nothing. Field 64 defines the lexical scope as global. The pointer field 66 indirectly points to the Variable Table 42 entry.

Further referring to FIG. 10, the Variable Table 42 entry has class field 70 defined as external definition, the offset field 72 includes the value 0, the field 74 indicates that the variable is user-defined, rather than synthesized, there are assorted flags provided in field 76 and the pointer field 78 explicitly points to the Type Scope Table 28 entry.

FIG. 11 is a representation of the user-defined variable N in the routine FOO and this requires use of the Type Scope Table 28, Variable Table 42 and Location Range Table 43. The Expression Table 29 is not required since there is no expression for the variable N. For the entry in Type Scope Table 28, the field 60 is the name of the variable, that is, N. The type is integer*4. The lexical scope field shows that this scope is the subroutine FOO. The pointer field 66 relates to the Variable Table 42 entry indirectly.

The Variable Table 42 field 70 for class indicates "argument pointer". The offset field shows that the offset is 0. The flag field 74 shows that the variable is user-defined. Assorted flags are in field 76. The pointer field 78 relates explicitly to the Type Scope Table 28 entry. The pointer field 82 relates implicitly to both of the Location Range Table 43 entries.

In the Location Range Table (43) entries shown in FIG. 11, the home offset is for field 94. This field value is either home offset or ephemeral to indicate the location of the variable for the entry. The location is 4, the start PC for field 98 is 80 and the end PC in field 100 is 196. The second Location Range Table 43 entry has field 94 indicating ephemeral register "s0" in field 96. The start PC in field 98 is 84 and the end PC in field 100 is 90. If the program counter is greater than or equal to 84 and is also less than or equal to 90, the value for the variable N is in the register s0. But, if the program count is greater than or equal to 80 and less than or equal to 196, the value is at the location of the argument pointer+4, plus one level of indirection. Otherwise there is no value for N.

Referring now to FIG. 12, there is shown the table entries necessary for the synthesized variable "?i4" produced for the routine FOO. In this case there is no requirement to have the Type Scope Table 28. In the Variable Table 42 entry, field 70 indicates that the class is automatic, the offset is 0 in field 72, the variable is synthesized as shown in field 74, and there are various assorted flags in field 76. The pointer field 80 implicitly points to the Expression Table 29 entry. The pointer field 82 implicitly points to the two Location Range Table 43 entries at the lower portion of the Figure.

The Expression Table (29) entry in FIG. 12 identifies in field 84 as the variable ?i4. The reason for producing this synthesized variable is that it is a loop induction variable, as indicated in field 86. This variable uses in its definition another synthesized variable identified as "?i2". The expression, field 90, which defines the synthesized variable is ?i4=?i2 +2. The pointer field 92 explicitly points to the Variable Table 42 entry.

Further referring to FIG. 12, there are shown two Location Range Table 43 entries. The field 96 entry for home offset indicates that the offset is 0. The start PC count is 142 and the end PC count is 194. The pointer field 102 explicitly points to the Variable Table 42 entry. In the second of the Location Range Table 43 entries, the location field 94 indicates that the location is ephemeral at register s3. The start PC is 142 and the end PC is 152. The pointer field 102 explicitly points to the Variable Table 42 entry.

For the ?i4 variable described in the tables in FIG. 12, the value of ?i4 can be determined if the value of the synthesized variable ?i2 can be solved. If the $PC \geq 142$ and $PC \leq 152$, the value in register s3 is returned as the value for the variable ?i4. If the $PC \geq 142$ and $PC \leq 194$, the value is at the frame pointer+0, see field 96. Otherwise, there is no value available for the synthesized variable ?i4.

Detailed examples for each of the Tables 28, 29, 42 and 43 corresponding to the routine FOO (listed above) are presented below. This routine (FOO) was compiled with both the optimization of vectorization and induction variable elimination.

TABLE 1

TYPE SCOPE TABLE

Scope Node Tree: ----------------------
Entries (lexical scope FOO): ----------------------------------
Name: FOO, Type: <## Function        Result: <## Void>
    Args: 2 -(
        Array: <## Int4>
            Bound Pairs: 1-(
                {Constant: 1 .. Dynamic Type: <## Int4> .. Assumed})
        Int4
    )
Name: A, Type: <## Array <## Int4>
    Bound Pairs: 1-(
        {Constant: 1 .. Dynamic Type: <## Int4> .. Assumed})
Name: N, Type: <## Int4>
Name: I, Type: <## Int4>

The Type Scope Table 28 is illustrated in Table 1 for the subroutine FOO. This is described in reference to the overall Table 28 description in FIG. 8. The ID field 60 entry in Table 28 corresponds to the names FOO, A, N and I in Table 1. The type field 62 corresponds to the entries in Table 1 following the word "Type:". These include the words Function, Array, and Int4. The term Int4 means the integer 4. The pointer field 66 in FIG. 8 is linked by an implicit pointer (line 110) to the entry in the Variable Table 42.

TABLE 2

VARIABLE TABLE

|      | NAME | CLASS   | SYNTHE-SIZED | OFFSET | FLAGS |
|------|------|---------|--------------|--------|-------|
| (0)  | FOO  | EXTDEF  | No           | 0      | [NEVER REFED] |
| (1)  | A    | ARG.PTR | No           | 0      | [ARGUMENT FLAG] [ALLOCATED} |
| (2)  | N    | ART.PTR | No           | 0      | [ARGUMENT FLAG] [ADJUSTABLE DIMENSION] [ALLOCATED] |
| (3)  | I    | STATIC  | No           | 0      | [VALID OFFSET] [NEVER REFED] [ALLOCATED] |
| (4)  | ?i0  | AUTO    | Yes          | 0      | [NEVER REFED} |
| (5)  | ?i1  | AUTO    | Yes          | 0      | [NEVER REFED] |
| (6)  | ?i2  | AUTO    | Yes          | 0      | [NEVER REFED] |
| (7)  | ?i3  | AUTO    | Yes          | 0      | [NEVER REFED] |
| (8)  | ?i4  | AUTO    | Yes          | 0      | [] |
| (9)  | ?i5  | AUTO    | Yes          | 0      | [] |
| (10) | ?i6  | AUTO    | Yes          | 0      | [NEVER REFED] |

Table 2 above is an example of a Variable Table for the subroutine FOO listed above. This corresponds to the Variable Table 42 in FIGS. 1 and 9. The name column relates to the pointer field 78 which points to the named variable in the Type Scope Table. The class column corresponds to field 70, the class description in Table 2. Examples of the class include EXTDEF which is an abbreviation for an external definition. This indicates that the location for the variable needs to be determined through what is known as the loader symbol table stored in the executable file. ARG.PTR is an abbreviation for argument pointer. The argument pointer indicates that the variable is an argument to a routine and that the variable has been passed by reference to the routine. This is typically true of FORTRAN arguments. STATIC means that the variable has storage allocated for it, however, the variable is only visible from a single file, that is, the same variable with the same name is statically defined in multiple files and each variable will be a distinct variable. AUTO means that the variable is a stack allocated variable and it typically applies to local variables in both FORTRAN and "C".

Further referring to Table 2 and FIG. 9, the offset column for field 72 indicates the starting value for the variable. The synthesized flag column for field 74 indicates whether the variable is a user-defined variable or a synthesized variable. This corresponds to the terms "User-Defined" and "Synthesized" in Table 2.

The pointer to Expression Table field 80 in FIG. 9 is implicit by reference (line 114) to the Expression Table. Likewise, the pointer to the Location Range Table, field 82, is implicit by reference (line 116) to the Location Range Table 43. Within the Variable Table 42 entry in FIG. 9, the name, for example, FOO, A, N, I, provides the implied pointer to the Type Scope Table 28.

TABLE 3

EXPRESSION TABLE

| NAME | REASON | USES | EXPRESSION |
|------|--------|------|------------|
| ?i0 | Simple trip | I, N | ?i0 = ((-1*MAX(((4+N)/5),1))+((I-1)/5)) |
| ?i1 | Simple trip | I, N | ?i1 = (MAX(((4+N)/5),1)+((-1/5)*(I-1))) |
| ?i2 | Outer strip | I | ?i2 = (I) |
| ?i3 | Simple trip | ?i2 | ?i3 = (?i2+(5*<loop iteration>)) |
| ?i4 | Loop Induction Variable | ?i2 | ?i4 = (?i2+2) |
| ?i5 | Loop Induction Variable | ?i1 | ?i5 = ?i1 |
| ?i6 | Loop Induction Variable | A, ?i2 | ?i6 = (&A+((?i2-1)*4)) |

Referring to FIG. 9, there is shown the Expression Table 29, and Table 3 is a listing for an actual Expression Table for the routine FOO. The identifier field 84 corresponds to the name column in Table 3. The various names are ?i0, ?i1, ?i2, ?i3, etc. The reason column corresponds to the field 86 in the Expression Table of FIG. 6 and is represented by the various phrases including "simple trip", "outer strip" and "loop induction variable". The Uses Column corresponds to the uses field 88 to list the variables used in the expression. Last, the expression column for the expression field 90 corresponds to the expression in each of the entries of the Expression Table 29. For example, the identifier ?i4 has the expression:?i4 =(?i2+2).

TABLE 4

LOCATION RANGE TABLE

|      | TYPE | REGISTER | OFF-SET | BOUND-ARIES | VARIABLE TABLE ENTRY |
|------|------|----------|---------|-------------|----------------------|
| <0>  | Ephemeral   | s0 | — | 84:90   | N  |
| <1>  | Ephemeral   | s0 | — | 94:102  | N, |
| <2>  | Ephemeral   | s0 | — | 122:130 | N  |
| <3>  | Ephemeral   | 0  | — | 80:148  | A  |
| <4>  | Ephemeral   | a2 | — | 148:152 | ?i6 |
| <5>  | Ephemeral   | 52 | — | 126:152 | ?i5 |
| <6>  | Ephemeral   | s3 | — | 142:152 | ?i4 |
| <7>  | Ephemeral   | a2 | — | 152:194 | ?i6 |
| <8>  | Ephemeral   | s2 | — | 152:194 | ?i5 |
| <9>  | Ephemeral   | s3 | — | 152:194 | ?i4 |
| <10> | Home Offset | —  | 0 | 176:194 | A  |
| <11> | Home Offset | —  | 0 | 148:194 | ?i4 |
| <12> | Home Offset | —  | 4 | 148:194 | ?i5 |
| <13> | Home Offset | —  | 8 | 148:194 | ?i6 |

TABLE 4-continued

LOCATION RANGE TABLE

| | TYPE | REGISTER | OFF-SET | BOUND-ARIES | VARIABLE TABLE ENTRY |
|---|---|---|---|---|---|
| <14> | Home Offset | — | 4 | 80:196 | N |
| <15> | Home Offset | — | 0 | 194:196 | ?i4 |
| <16> | Home Offset | — | 4 | 194:196 | ?i5 |
| <17> | Home Offset | — | 8 | 194:196 | ?i6 |

The Location Range Table 43 in FIG. 9 includes the record type field 94 which corresponds to the Type column in Table 4. The Table 4 Type column entries are either "Ephemeral" or "Home Offset". Ephemeral means that the variable is located in a register. Home offset means that the variable is located in memory. The Boundaries column corresponds to the start PC field 98 and end PC field 100. For example, in entry <1> the start and end PC (program counter) numbers are 94 and 102 respectively. Last, the pointer to Variable Table entry field 102 in the Location Range Table 43 is the name, such as N, A, ?i6, and this functions as the implied pointer (line 120) back to the Variable Table 42 entry. The Variable Table Entry column corresponds to the pointer field 102 in FIG. 9. Examples for this column are N, A, ?i6, ?i5, etc.

The machine language instructions, program counter addresses, opcode and related information for the compiled routine FOO are listed below.

TABLE 5

| PROGRAM COUNTER | SYMBOLIC VALUE OF PROGRAM COUNTER | OP-CODE | OPERANDS | VARIABLE WHICH CORRESPONDS TO MEMORY ADDRESSES |
|---|---|---|---|---|
| 0x80001360 | F00: | ld.w | @4(ap),s0 | N |
| 0x80001364 | F00+(0x4): | lt.w | #0,s0 | N |
| 0x80001368 | F00+(0x8): | brs.f | F00+(0x3a) | |
| 0x8000136a | F00+(0xa): | ld.w | 0(ap),a2 | A |
| 0x8000136e | F00+(0xe): | ld.w | @4(ap),s3 | N |
| 0x80001372 | F00+(0x12): | ld.w | #3,s2 | |
| 0x80001376 | F00+(0x16): | ld.w | #4,vs | |
| 0x8000137a | F00+(0x1a): | mov | s3,v1 | |
| 0x8000137c | F00+(0x1c): | ld.w | _mth$d_indx+(0x418),v0 | |
| 0x80001382 | F00+(0x22): | add.w | v0,s2,v1 | |
| 0x80001384 | F00+(0x24): | st.w | v1,0(a2) | |
| 0x80001388 | F00+(0x28): | add.w | #512,a2 | |
| 0x8000138c | F00+(0x2c): | add.w | #128,s2 | |
| 0x80001390 | F00+(0x30): | add.w | #-128,s3 | |
| 0x80001394 | F00+(0x34): | lt.w | #0,s3 | |
| 0x80001398 | F00+(0x38): | brs.t | F00+(0x1a) | |
| 0x8000139a | F00+(0x3a) | rtn | | |

For variable N, there are 3 liveness ranges:

| Start | End | Location |
|---|---|---|

1. 0x80001364:0x8000136a - register s0
2. 0x80001372:0x80001376 - register s3
3. 0x80001360:0x8000139c - @(@($ap+4))

Figure 13:
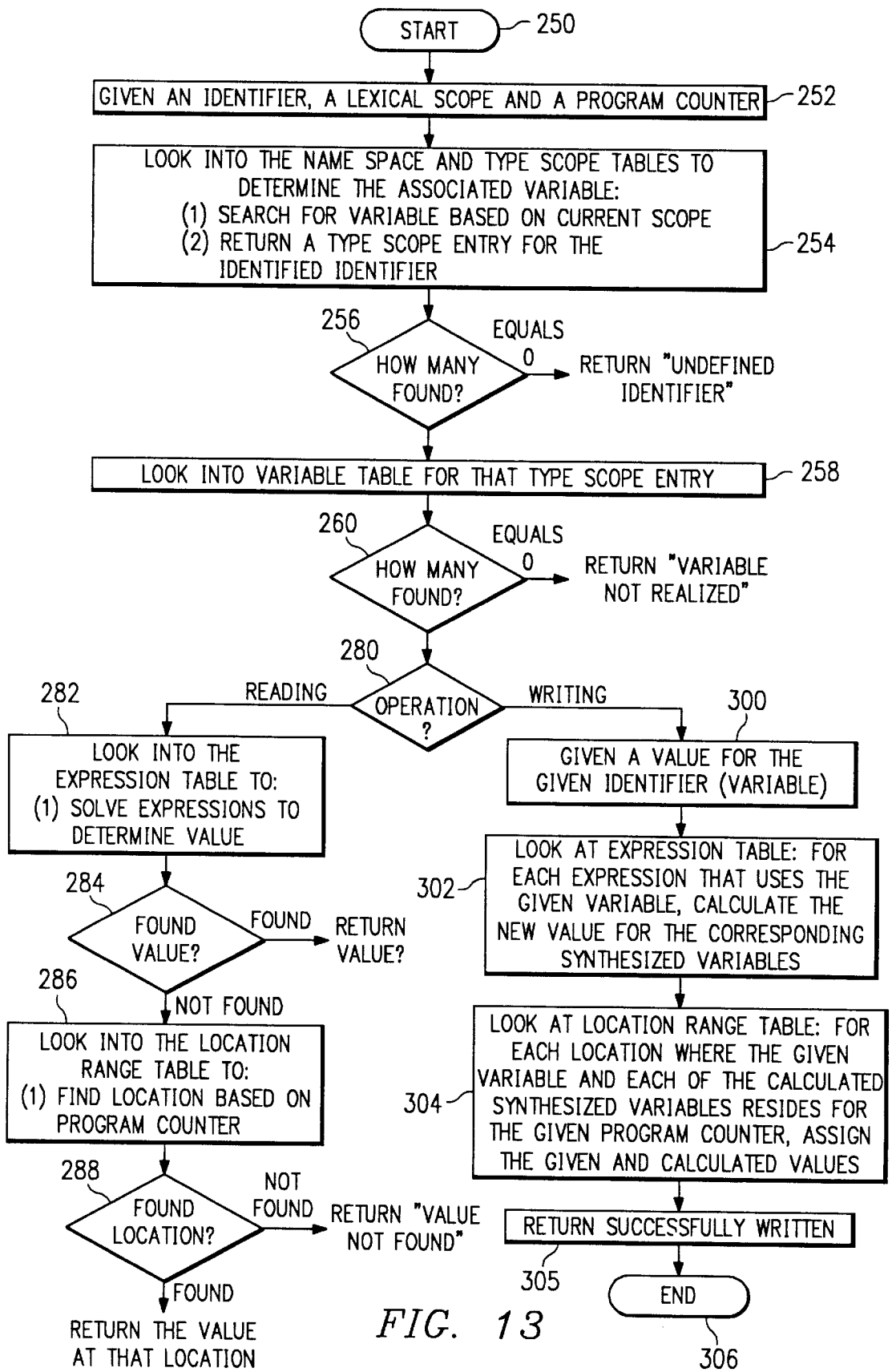
FIG. 13 is a flow diagram illustrating the determination of a value for an identifier during a debugging operation and the setting of a value during a debugging operation.

A fundamental aspect in the operation of a debugger program is to ascertain the value for a variable at a particular point of execution for the machine instructions. Each machine instruction is identified by a program counter (PC) value. Determining the value of a variable is necessary to the programmer in resolving a problem or understanding the operation of the program. A further aspect to the operation of a debugger is the insertion of a given value into a variable to set its value. In other words, forcing a variable to a given value. These operations for the present invention are described in reference to the flow diagram in FIG. 13. The operation is begun at the start point 250. In a first operational step 252 a programmer is given, or selects, an identifier, a lexical scope and a program counter valve. Referring to the above routine FOO, the programmer may wish to determine the identity of the identifier "I". The lexical scope is the routine FOO. The program counter is the value of the counter at a particular point in the execution of the machine language instructions.

In operational block 254 a look (search) is made into the Type Scope Table to search for a type scope entry based on the given identifier and the given lexical scope. The return is a scope entry having these two corresponding fields. The scope entry is ascertained from the Type Scope Table 28 as shown for fields 60 and 64 as shown in FIGS. 9–12. One or more entries may be found based on the given identifier and lexical scope. If no entries are found, the given identifier is not visible. The Name Space Table 31 is used in place of the Type Scope Table 28 for global identifiers.

In question block 256, an examination is made to determine if any entries were found in the Type Scope Table 28. If no entries were found, the "=0" exit is taken and the report "UNIDENTIFIED IDENTIFIER" is returned to the programmer. If one or more entries were found, transfer is made to the operational block 258 for a look into the Variable Table 42 from the linkage line 110 (pointer) from the Type Scope Table 28. None, one or more entries may be found.

Next, entry is made to the question block 260 to determine how many, if any, variables have been identified in the Variable Table. If none have been identified, the "=0" exit is taken and the report "VARIABLE NOT REALIZED" is returned to the programmer. If one or more variables have been identified in the Variable Table 42, entry is made to a question block 280.

Within the question block 280, the programmer defines whether the required operation is reading the value of a variable or writing a value into the given variable. If the "READING" exit is taken, entry is made to operation block 282 and within this operation a look (search) is made into the Expression Table 29 for each entry which includes the given variable in the USES field 88. (See FIG. 9) Next, an attempt is made to solve the expressions in each entry and determine the value for the variable in question. The expression equation is in field 90 of Table 29, as shown in FIG. 9.

Following operational block 282, entry is made into a question block 284 which determines if a value has been found for the subject variable by solving the expressions. It may be necessary to recursively cycle between the Expression Table entries and the Variable Table entries to solve for the given variable. If a solution is produced, the "FOUND" exit is taken and the determined value is returned to the programmer as the value of the variable (I) in question. If a value is not found by solving the expressions, exit is made through the "NOT FOUND" exit into an operational block 286.

Within the operational block 286, a look is made into the Location Range Table 43 to find a location based on the given program counter valve that exists in the program at the time the inquiry is made to determine the value of the variable. The search into the Location Range Table 43 is made into the PC range defined by fields 98 and 100. If the given program counter is not within a range in the Location Range Table, the "NOT FOUND" exit is taken and the report "VALUE NOT FOUND" is reported to the programmer. If the given program counter value does exist within the range in the Location Range Table 43, the "FOUND" exit is taken and the value of the given variable at a storage location which is defined by field 96 and the offset field 72 in the Variable Table 42 is reported to the programmer.

Returning to the question block 280, if the selected operation is "WRITING", entry is made to an operational block 300. Within this block a variable is given a value by the programmer. It is the objective to force a value for the given variable, which variable was selected in operational block 252.

From block 300, entry is made to operational block 302 in which a look is made at the Expression Table 29 for each expression that uses the given variable. The given value is applied to the given variable and a calculation is made for a new value for the synthesized variable represented by the expression. See FIG. 9 for the expression field 90 within the Expression Table 29.

From block 302, operation is transferred to block 304 in which a look is made at the Location Range Table to determine each location where the given variable and each related synthesized variable resides for the current program counter value. The calculated values for the given variable and the related synthesized variable are assigned to each of the variables for each occurrence.

Finally, transfer is made to operational block 305 for reporting back to the programmer that the given variable has been successfully written. The operation is completed at the end step 306.

In summary, the present invention provides a method for producing tables for defining variables when source code has been subjected to optimized compiling, for determining a value for variables at a given program counter address and for writing a value into a variable at a selected point in program execution.

Although only one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

What we claim is:

1. A method implemented in a computer for establishing definitions for variables in source code and object code compiled therefrom, comprising the steps of:

processing said source code to determine the variables therein, generating a type scope table which includes an entry for each of said variables in said source code and including in each said type scope table entry an identification of the variable and the lexical scope of the variable, processing said source code to produce compiler nodes and synthesized variables, generating a respective expression to define each of said synthesized variables, annotating each of said synthesized variables with the respective expression, generating said object code in machine language instructions as a function of said compiler nodes and said synthesized variables, generating an expression table which includes an entry for each of said synthesized variables and including in each said expression table entry a variable identification and the corresponding said expression, generating a location range table which includes an entry for each of said variables and including in each said location range entry a variable identification, a location for the variable in the entry and a range of machine instructions which utilizes the variable, and generating a variable table which includes an entry for each of said variables and including in each said variable table entry a class identification, a notation of being either a user or synthesized variable, a link to a one of the entries in said type scope table, a link to a one of the entries in said expression table if said variable is a synthesized variable, and a link to one of said entries in said location range table, wherein said tables define each of said variables for a given one of said machine instructions.

2. In a computing system, an improved debugger program for examining user-defined and synthesized variables for use with object code compiled with optimization from source code, wherein the optimization generates said synthesized variables developed from identifiers which include said user-defined variables and said synthesized variables, comprising:

a type scope table having a plurality of entries, each entry including at least an identification for one of said identifiers and a lexical scope for the identifier in the entry, a variable table having a plurality of entries, each entry including at least storage class description, a starting storage location for the variable in the entry and a pointer from this entry to a corresponding entry in said type scope table, an expression table having a plurality of entries, each entry including at least an identification for a synthesized variable, an expression for the variable in the entry and a pointer to a corresponding entry in said variable table, and a location range table having a plurality of entries, each entry including at least a basic location argument for a given variable, a program count range over which the given variable is alive and a pointer to a corresponding entry in said variable table, wherein said tables define each of said variables for a given program count range.

3. A method implemented in a computer for examining a given variable for a given program counter value in a program, the given variable having a given lexical scope within the program, wherein object code for the program has been produced from source code by optimized compiling which produces synthesized variables, the method comprising the steps of:

searching a type scope table, which has a plurality of entries, each entry including an identification for a variable in said program and a lexical scope for that variable, said searching to identify a type scope table entry therein which has a lexical scope that corresponds to said given lexical scope and an identification which corresponds to said given variable, searching a variable table which has a plurality of entries, each entry including a pointer to an entry in said type scope table, a class indication for the variable corresponding to the variable table entry and an offset for a location of the corresponding variable table entry, said searching to determine if any of said variable table entries has a pointer therein to said identified type scope table entry, if no variable table entry has a pointer to said identified type scope table entry, reporting that said given variable is not realized, if a variable table entry is determined which has a pointer to said identified type scope table entry, searching an expression table, which has a plurality of entries, each entry including an identification for an identifier, an expression which defines the corresponding identifier and a listing of variables used in said expression, said searching to select each expression table entry which has an identifier identification that corresponds to said given identifier or has said given identifier in said listing of variables, solving each of the expressions in said selected expression table entries to produce a value for said given identifier, and reporting said value of said given identifier.

4. A computer operating method for examining a given identifier for a given program counter value in a program, the given identifier having a given lexical scope within the program, wherein object code for the program has been produced from source code by optimized compiling which produces synthesized variables, the method comprising the steps of:

searching a type scope table, which has a plurality of entries, each entry including an identification for an identifier in said program and a lexical scope for that identifier, said searching to identify a type scope table entry therein which has a lexical scope that corresponds to said given lexical scope and an identification which corresponds to said given identifier, searching a variable table which has a plurality of entries, each entry including a pointer to an entry in said type scope table, a class indication for a variable corresponding to the variable table entry and an offset for a location of the corresponding variable table entry, said searching to determine if any of said variable table entries has a pointer therein to said identified type scope table entry, if a variable table entry is determined which has a pointer to said identified type scope table entry, searching an expression table, which has a plurality of entries, each entry including an identification for an identifier, an expression which defines the corresponding identifier and a listing of variables used in said expression, said searching to select each expression table entry which has an identifier identification that corresponds to said given identifier or has said given identifier in said listing of variables, solving each of the expressions in said selected expression table entries to attempt to produce a value for said given identifier, if said step of solving cannot produce a value for said given identifier, searching a location range table, which has a plurality of entries, each entry includes a pointer to one of said variable table entries, a location for a value for a corresponding one of said identifiers, and a start program counter value and an end program counter value defining a counter range, said searching to determine if there is a location range table entry which includes said given program counter value therein and corresponds to said given identifier, and if said step of searching said location range table determines a location range table entry, reading the value of said given identifier at said location set forth in said determined location range table entry.

5. A method implemented in a computer for writing a given value into a given identifier for a given program counter value in a program, the given variable having a given lexical scope within the program, wherein object code for the program has been produced from source code by optimized compiling which produces synthesized variables, the method comprising the steps of:

searching a type scope table, which has a plurality of entries, each entry including an identification for an identifier in said program and a lexical scope for that identifier, said searching to identify a type scope table entry therein which has a lexical scope that corresponds to said given lexical scope and an identification which corresponds to said given identifier, searching a variable table which has a plurality of entries, each entry including a pointer to an entry in said type scope table, a class indication for the variable corresponding to the variable table entry and an offset for a location of the corresponding variable table entry, said searching to determine if any of said variable table entries has a pointer therein to said identified type scope table entry, and if one of said variable table entries has a pointer to said identified type scope table entry, searching an expression table which has a plurality of entries, each entry including an identification for an identifier, an expression which defines the corresponding identifier and a listing of variables used in said expression, said searching to select each expression table entry which has said given identifier in said listing of variables, thereby identifying a group of variables which are related to said given identifier, Solving each of the expressions in said selected expression table entries to produce a value for each of the corresponding identifiers, searching a location range table which has a plurality of entries, each entry includes a pointer to one of said variable table entries, a location for a value for a corresponding one of said identifiers, and a start program counter value and an end program counter value defining a counter range, said searching to identify each location range entry which includes said given program counter value with the counter range and thereby identifying each corresponding location for a said given identifier and each of said identifiers in said group of identifiers, and writing values for said given identifier and for said identifiers in said group into said corresponding locations identified in searching said location range table.

6. A method implemented in a computer for defining synthesized variables in a program wherein source code, which includes user-defined variables, has been compiled to produce object code, which comprises a sequence of machine language instructions, the method comprising the steps of:

processing said source code to produce compiler nodes which include both entry nodes and computation nodes, annotating selected ones of said compiler nodes with symbolic equations which define values of said selected compiler nodes as a function of at least one of said user-defined variables, generating a plurality of synthesized variables corresponding respectively to said selected compiler nodes, each of said synthesized variables having a defining expression which includes (1) the symbolic equation associated with the corresponding compiler node and (2) a relationship with at least one other related compiler node, storing in an expression table, for each entry thereof, an identification for one of said synthesized variables and the corresponding defining expression, and storing in a location range table, for each entry thereof, an identification for one of said synthesized variables and a range of said machine language instructions over which the corresponding synthesized variable is alive, wherein each of said synthesized variables (1) is defined by the corresponding defining expression in said expression table and (2) is alive over the corresponding range of machine language instructions in said location range table.

7. A method implemented in a computer for defining synthesized variables in a program wherein source code, which includes loop induction variables, has been compiled to produce object code, which comprises a sequence of machine language instructions, the method comprising the steps of:

processing said source code to produce compiler nodes which include both entry nodes and computation nodes, wherein selected ones of said computation nodes relate to loop induction variables in said source code, annotating the selected ones of said compiler nodes with respective symbolic equations which define values of said selected compiler nodes as a function of at least one of said loop induction variables, generating a plurality of synthesized variables correspondingly respectively to said selected compiler nodes, each of said synthesized variables having a defining expression which includes the symbolic equation associated with the corresponding selected compiler node, storing in an expression table, for each entry thereof, one of said synthesized variables and the corresponding defining expression, and storing in a location range table, for each entry thereof, an identification for one of said synthesized variables and a range of said machine language instructions over which the corresponding synthesized variable is alive, wherein each of said synthesized variables (1) is defined by the corresponding defining expression in said expression table and (2) is alive over the corresponding range of machine language instructions in said location range table.

8. A method implemented in a computing system for examining a given variable for a given program counter value in a program, the given variable having a given lexical scope within the program, wherein object code for the program has been produced from source code by optimized compiling which produces synthesized variables, the method comprising the steps of:

searching a type scope table, which has a plurality of entries, each entry including an identification for a variable in said program and a lexical scope for that variable, said searching to identify a type scope table entry therein which has a lexical scope that corresponds to said given lexical scope and an identification which corresponds to said given variable, searching a variable table which has a plurality of entries, each entry including a pointer to an entry in said type scope table, a class indication for the variable corresponding to the variable table entry and an offset for a location of the corresponding variable table entry, said searching to determine if any of said variable table entries has a pointer therein to said identified type scope table entry, if a variable table entry is determined which has a pointer to said identified type scope table entry, searching an expression table, which has a plurality of entries, each entry including an identification for a variable, an expression which defines the corresponding variable and a listing of variables used in said expression, said searching to select each expression table entry which has a variable identification that corresponds to said given variable or has said given variable in said listing of variables, solving each of the expressions in said selected expression table entries to produce a value for said given variable, and reporting said value of said given variable.

* * * * *

UNITED STATES PATENT AND TRADEMARK OFFICE
CERTIFICATE OF CORRECTION

PATENT NO. : 5,956,512 Page 1 of 1
DATED : September 21, 1999
INVENTOR(S) : Steven M. Simmons et al.

It is certified that error appears in the above-identified patent and that said Letters Patent is hereby corrected as shown below:

Column 16,
Line 59, delete "<5> Ephemeral 52 ---   126:152  ?i5" and insert therefor
-- <5> Ephemeral s2 ---   126:152  ?i5 --

Signed and Sealed this

Fourth Day of June, 2002

*Attest:*

*Attesting Officer*

JAMES E. ROGAN
*Director of the United States Patent and Trademark Office*